(12) United States Patent
Hinosugi et al.

(10) Patent No.: US 8,254,252 B2
(45) Date of Patent: Aug. 28, 2012

(54) BANDWIDTH CONTROL APPARATUS

(75) Inventors: Hideki Hinosugi, Tokyo (JP); Atsushi Anzai, Ebina (JP); Takeshi Kumagai, Atsugi (JP)

(73) Assignee: Alaxala Networks Corporation, Kanagawa (JP)

( * ) Notice: Subject to any disclaimer, the term of this patent is extended or adjusted under 35 U.S.C. 154(b) by 310 days.

(21) Appl. No.: 12/625,595

(22) Filed: Nov. 25, 2009

(65) Prior Publication Data

US 2010/0189129 A1    Jul. 29, 2010

(30) Foreign Application Priority Data

Jan. 27, 2009   (JP) ................................. 2009-015707

(51) Int. Cl.
*H04L 12/26* (2006.01)
(52) U.S. Cl. ...................................................... 370/229
(58) Field of Classification Search .......... 370/229–236, 370/351, 389, 395.4–395.54; 709/227–229
See application file for complete search history.

(56) References Cited

U.S. PATENT DOCUMENTS

| | | | | |
|---|---|---|---|---|
| 5,784,358 | A * | 7/1998 | Smith et al. ..................... | 370/230 |
| 6,452,905 | B1 * | 9/2002 | Smith et al. ................. | 370/236.1 |
| 6,882,642 | B1 * | 4/2005 | Kejriwal et al. .............. | 370/388 |
| 7,035,211 | B1 * | 4/2006 | Smith et al. .................... | 370/230 |
| 7,184,398 | B2 * | 2/2007 | McKinnon et al. ............ | 370/230 |
| 2004/0136379 | A1 * | 7/2004 | Liao et al. ................. | 370/395.21 |
| 2006/0165009 | A1 * | 7/2006 | Nguyen et al. ................ | 370/252 |
| 2007/0081554 | A1 * | 4/2007 | Saffre ........................... | 370/468 |

FOREIGN PATENT DOCUMENTS

| | | |
|---|---|---|
| JP | 2002-300177 | 10/2002 |
| JP | 2003-198611 | 7/2003 |
| JP | 2003-318967 | 11/2003 |
| JP | 2004-282728 | 10/2004 |
| JP | 2005-202589 | 7/2005 |
| JP | 2007-243382 | 9/2007 |
| JP | 2008-048131 | 2/2008 |

OTHER PUBLICATIONS

Japanese Office Action dated Jun. 19, 2012; Japanese Application No. 2009-015707, 7 pages.

* cited by examiner

*Primary Examiner* — Dmitry H Levitan
(74) *Attorney, Agent, or Firm* — Antonelli, Terry, Stout & Kraus, LLP.

(57) ABSTRACT

A bandwidth calculation section calculates a usable bandwidth from a communication amount of each user or a session connection time stored in a statistic management memory and minimum bandwidth information and maximum bandwidth information recorded in a bandwidth setting memory. The bandwidth calculation section allocates a large usable bandwidth to a user with a small communication amount or a short session connection time. A transmission control section performs transmission scheduling of packet information stored in a packet buffer based on a transmission scheduled time calculated from the usable bandwidth stored in a transmission scheduled time memory.

18 Claims, 15 Drawing Sheets

| USER | GROUP BANDWIDTH [bps] | MINIMUM BANDWIDTH [bps] | MAXIMUM BANDWIDTH [bps] | REDUNDANT BANDWIDTH [bps] | AVERAGE COMMUNICATION AMOUNT [byte/hour] | DISTRIBUTION RATIO OF REDUNDANT BANDWIDTH | REDUNDANT BANDWIDTH ALLOCATED TO EACH USER [bps] | USABLE BANDWIDTH [bps] |
|---|---|---|---|---|---|---|---|---|
| A | 1G | 100M | 1G | 700M | 1G | 6 | 382M | 482M |
| B |  | 100M | 1G |  | 2G | 3 | 191M | 291M |
| C |  | 100M | 1G |  | 3G | 2 | 127M | 227M |

*HERE, CALCULATION TIME RANGE OF AVERAGE COMMUNICATION AMOUNT IS MADE PAST ONE HOUR.

FIG. 5

| USER | GROUP BANDWIDTH [bps] | MINIMUM BANDWIDTH [bps] | MAXIMUM BANDWIDTH [bps] | REDUNDANT BANDWIDTH [bps] | SESSION CONNECTION TIME [min] | DISTRIBUTION RATIO OF REDUNDANT BANDWIDTH | REDUNDANT BANDWIDTH ALLOCATED TO EACH USER [bps] | USABLE BANDWIDTH [bps] |
|---|---|---|---|---|---|---|---|---|
| A | 1G | 100M | 1G | 700M | 10 | 1/10 | 457M | 557M |
| B | | 100M | 1G | | 20 | 1/20 | 228M | 328M |
| C | | 100M | 1G | | 300 | 1/300 | 15M | 115M |

| TRANSMISSION SCHEDULED TIME ACCORDING TO MAXIMUM BANDWIDTH OF GROUP | INFORMATION OF PACKET PRESENCE OR ABSENCE OF GROUP | USER ID INFORMATION | TRANSMISSION SCHEDULED TIME ACCORDING TO USABLE BANDWIDTH OF USER | TRANSMISSION SCHEDULED TIME ACCORDING TO MAXIMUM BANDWIDTH OF USER | INFORMATION OF PACKET PRESENCE OR ABSENCE OF USER |
|---|---|---|---|---|---|
| TIME 1 | PRESENCE | A | TIME A2 | TIME A3 | PRESENCE |
| | | B | TIME B2 | TIME B3 | ABSENCE |
| | | C | TIME C2 | TIME C3 | PRESENCE |
| : | : | : | : | : | : |
| | | : | : | : | : |
| | | : | : | : | : |

FIG. 12

| MAXIMUM BANDWIDTH INFORMATION OF GROUP | USER ID INFORMATION |
|---|---|
| 1G | A |
|  | B |
|  | C |
| ⋮ | ⋮ |
|  | ⋮ |
|  | ⋮ |

FIG. 13

BANDWIDTH CONTROL APPARATUS

CLAIM OF PRIORITY

The present application claims priority from Japanese patent application JP 2009-015707 filed on Jan. 27, 2009, the contents of which are hereby incorporated by reference into this application.

BACKGROUND OF THE INVENTION

1. Field of the Invention

The present invention relates to a bandwidth control apparatus and a communication control semiconductor, and particularly to a bandwidth control apparatus and a communication control semiconductor in which in a communication field such as an IP network, a usable bandwidth is calculated based on a previously set minimum bandwidth and maximum bandwidth, and information of a communication amount or session connection time, and bandwidth control can be performed.

2. Description of the Related Art

Since the access control of Ethernet technique (Ethernet is a registered trademark) used in an Internet network or in-company LAN is controlled by the Carrier Sense Multiple Access/Collision Detection (CSMA/CD) system, there is a characteristic that the bandwidth is liable to be occupied by a user who transmits and receives many packets. That is, when a user (hereinafter referred to as a heavy user) who exerts an excessive network load exists on the same line, there is a case where the communication bandwidth of a user who infrequently conducts the communication or whose communication amount in a specific time is low (hereinafter referred to as a light user) is not sufficiently ensured. Thus, an Internet Services Provider (ISP) to provide continuous access to the Internet uses a packet relay apparatus having a bandwidth control function to prevent unfairness in usable bandwidth between users.

As the technique to provide the bandwidth control function as stated above, for example, JP-A-2003-198611 discloses a bandwidth control method using a minimum bandwidth and a maximum bandwidth for each user, in which a transmission right is given to a buffer in a state where a leaky packet level exceeds the minimum bandwidth.

JP-A-2003-318967 discloses a bandwidth control technique in which between an input side node to transmit a packet and an output side node to receive a packet, a transmission permissible rate of a data packet to be transmitted to the output side is determined based on information included in a control packet in which control packet transmission time and a data accumulation amount are recorded.

As one of reasons why the line bandwidth of each ISP is stressed, there is a Peer to Peer (P2P) application. The related art server-client type communication includes a server which concentrically manages information resources and a client which uses the information resources managed by the server, and there is a case where load is concentrated on the server. On the other hand, in the P2P-type communication, each terminal functions as both the server and the client. In the P2P network, when an access is made to information resources, the information resources are transmitted through an adjacent client, and the information resources are stored also in the client of the relay node, so that the information resources are spread. Since the client can function as the server by using the spread information, there is a feature that local concentration of loads can be prevented. Although the P2P is a excellent communication technique, there is a case where for example, copyright infringement material circulates on the P2P network, and an increase in traffic of the whole network is consequently caused. From the background as stated above, the movement of regulating the P2P application communication as the factor of the traffic increase occurs gradually in the ISP.

As the technique to provide such a bandwidth control function, for example, JP-A-2005-202589 discloses a technique in which a dummy node such as a honey pot is installed, a traffic corresponding to the P2P application is guided, analysis is performed up to the application layer of the traffic, and the bandwidth control is performed.

Besides, JP-A-2008-48131 discloses a bandwidth control in which feature points of a P2P application are statistically grasped, and particularly, attention is paid to the feature points of the SYN/ACK process of the P2P application, and it is determined by a statistical method whether or not the traffic is the P2P application.

SUMMARY OF THE INVENTION

By the bandwidth control technique as in JP-A-2003-198611, it becomes possible to correct the bias in the communication bandwidth between users at the time of network congestion. However, since the bandwidth control is performed without differentiating between the heavy user who gives the excessive load to the network and the light user, when viewed in a long-term span, it is impossible to correct the tendency that the heavy user is liable to occupy the line bandwidth. For the ISP in which traffic increase is a problem, it is necessary to provide a bandwidth control technique which can correct the tendency that the heavy user occupies the line bandwidth.

In JP-A-2003-318967, the control is performed such that the permissible transmission rate is calculated from the amount of packets stored in the buffer at the bandwidth calculation, and the transmission suppression is performed for the input side node to transmit a packet. However, it is difficult to identify from the amount of packets stored in the buffer whether or not the user is the heavy user. Besides, since the control packet is exchanged between the communication equipments, the load is exerted on the network, and the input side node is required to be provided with a bandwidth suppression function based on the information of the control packet, and there is a problem that the equipment configuration lacks flexibility.

Incidentally, as a solving method based on operation, it is conceivable to take such measures that when the communication amount exceeds a certain threshold, a pay-as-you-go system is introduced for the excess, or the heavy user is identified and the use of the user is terminated. However, even if there is an upper limit of the communication amount, there is a heavy user who attempts to perform communication to the utmost within the range not reaching the upper limit value, and the fundamental solution of the problem is not achieved. Besides, when the upper limit of the communication amount is provided, the free use of the network is prevented, and there is a case where the attraction of the communication service is spoiled.

Besides, as in JP-A-2005-202589, in the traffic analysis method of guiding and analyzing the user traffic for the bandwidth suppression of the P2P application, plural packets are assembled, and checking and monitoring up to the application layer of the traffic must be performed. Thus, the analysis process is very complicated and is liable to become the bottle neck in the performance. Besides, the performance deterioration of the network is caused, there is a high possibility that a delay due to the process waiting until the traffic analysis is completed occurs, and there is a case where an influence is exerted on the reduction of the effective speed of Transmission Control Protocol (TCP) communication and easiness of conversation in bidirectional real-time communication such as telephone. Besides, in order to install the apparatus dedicated to the traffic analysis in the whole country, a vast increase in cost can not be avoided, and there is a case where the profit of each ISP is compressed.

Besides, in the identifying method of the P2P communication by the statistic analysis method as in JP-A-2008-48131, when a feature point of an application communication which is not a bandwidth control object is imitated, it is difficult to determine whether or not the object is the bandwidth limitation object, and there is a high possibility that the bandwidth limitation can be easily avoided by changing the communication procedure or the like.

In view of the above circumstances, it is an object of the invention to provide a bandwidth control apparatus and a communication control semiconductor, in which a tendency that a heavy user with a large communication amount is liable to occupy a bandwidth is corrected, and when a line has room, the bandwidth can be used up to a maximum bandwidth of each user.

Besides, it is another object of the invention to perform fine bandwidth control based on a communication state, for example, a usable bandwidth for a heavy user is made small, and a usable bandwidth for a light user is made large. Besides, it is another object of the invention to provide an optimum bandwidth control method for an ISP to provide an always-connected service, in which a difference in communication amount between a heavy user and a light user is corrected.

Further, it is another object of the invention to provide a bandwidth control apparatus having a bandwidth control function to calculate a usable bandwidth from a communication amount of each user and a minimum bandwidth/maximum bandwidth. Besides, it is another object of the invention to provide a bandwidth control apparatus having a bandwidth control function to calculate a usable bandwidth from a session connection time of each user.

A bandwidth control apparatus and a communication control semiconductor according to an aspect of the invention are for controlling an output bandwidth of each user in the bandwidth control apparatus having a bandwidth control function by a previously specified minimum bandwidth and maximum bandwidth for a received variable length packet, and the bandwidth control apparatus includes a search engine to classify received packets for respective users, a packet buffer to store the received packets during transmission scheduling, a discard control section to manage an average communication amount for each user, a transmission statistic and a session connection time, a bandwidth calculation section to calculate a usable bandwidth from the minimum bandwidth and the maximum bandwidth previously set for each user, and a transmission control section which performs scheduling between the users by the usable bandwidth and transmission control by the maximum bandwidth, and reads packet information of a transmission user from the packet buffer, in which the bandwidth calculation section determines a distribution ratio of a redundant bandwidth based on the average communication amount of each user managed by the discard control section and calculates the usable bandwidth from the distribution ratio of the redundant bandwidth, and the bandwidth suppression is performed on a user with a large communication amount.

In the bandwidth control apparatus and the communication control semiconductor, the bandwidth calculation section determines the distribution ratio of the redundant bandwidth based on the session connection time of each user managed by the discard control section, and calculates the usable bandwidth from the distribution ratio of the redundant bandwidth, and the bandwidth suppression is performed on a user who performs communication continuously for a long time.

According to the first solving means of this invention, there is provided a bandwidth control apparatus comprising:
a packet buffer to store a received packet for each user;
a discard control section to manage a packet communication amount for each user;
a bandwidth calculation section to allocate a bandwidth to a user, which decreases the bandwidth allocated to the user with a relatively large average communication amount per previously determined unit time, and increases the bandwidth allocated to a user with the relatively small average communication amount; and
a transmission control section which selects a transmission user to transmit a packet according to packet presence or absence for each user stored in the packet buffer and allocated bandwidth, reads the packet of selected transmission user from the packet buffer and transmits read packet.

According to the second solving means of this invention, there is provided a bandwidth control apparatus comprising:
a packet buffer to store a received packet for each user,
a discard control section which manages a packet communication amount for each user, refers to the packet communication amount per previously determined time and obtains a session connection time;
a bandwidth calculation section to allocate a bandwidth to a user, which decreases the bandwidth allocated to the user with a relatively large session connection time, and increases the bandwidth allocated to the user with a relatively small session connection time; and
a transmission control section which selects a transmission user to transmit a packet according to packet presence or absence for each user stored in the packet buffer and allocated bandwidth, reads the packet of selected transmission user from the packet buffer and transmits read packet.

According to the third solving means of this invention, there is provided a bandwidth control apparatus comprising:
a packet buffer to store a received packet for each traffic type or each flow;
a discard control section to manage a packet communication amount for each traffic type or each flow;
a bandwidth calculation section to allocate a bandwidth to a traffic type or a flow, which decreases a bandwidth allocated to the traffic type or the flow with a relatively large average communication amount per previously determined unit time, and increases the bandwidth allocated to the traffic type or the flow with a relatively small average communication amount; and
a transmission control section which selects the traffic type or the flow to transmit a packet according to packet presence or absence for each traffic type or each flow stored in the packet buffer and allocated bandwidth, reads the packet of the traffic type or the flow from the packet buffer and transmits read packet.

According to the fourth solving means of this invention, there is provided a bandwidth control apparatus comprising:
a packet buffer to store a received packet for each traffic type or each flow;
a discard control section which manages a packet communication amount for each traffic type or each flow, refers to the packet communication amount per a previously determined time, and obtains a session connection time;

a bandwidth calculation section to allocate a bandwidth to a traffic type or a flow, which decreases the bandwidth allocated to the traffic type or the flow with a relatively large session connection time, and increases the bandwidth allocated to the traffic type or the flow with a relatively small session connection time; and a transmission control section which selects the traffic type or the flow to transmit a packet according to packet presence or absence for each traffic type or each flow stored in the packet buffer and allocated bandwidth, reads the packet of the traffic type or the flow from the packet buffer and transmits read packet.

According to one of the solving means of this invention, there is provided a communication control processor comprising:

a buffer control function to store a received packet for each user;

a discard control function to manage a packet communication amount for each user;

a bandwidth calculation function to allocate a bandwidth to a user, which decreases the bandwidth allocated to the user with a relatively large average communication amount per previously determined unit time, and increases the bandwidth allocated to a user with the relatively small average communication amount; and a transmission control function which selects a transmission user to transmit a packet according to packet presence or absence for each user stored by the buffer control function and allocated bandwidth, reads the packet of selected transmission user from the buffer control function and transmits read packet.

According to another solving means of this invention, there is provided a communication control processor comprising:

a buffer control function to store a received packet for each user, a discard control function which manages a packet communication amount for each user, refers to the packet communication amount per previously determined time and obtains a session connection time;

a bandwidth calculation function to allocate a bandwidth to a user, which decreases the bandwidth allocated to the user with a relatively large session connection time, and increases the bandwidth allocated to the user with a relatively small session connection time; and a transmission control function which selects a transmission user to transmit a packet according to packet presence or absence for each user stored by the buffer control function and allocated bandwidth, reads the packet of selected transmission user from the buffer control function and transmits read packet.

According to another solving means of this invention, there is provided a communication control processor comprising:

a buffer control function to store a received packet for each traffic type or each flow;

a discard control function to manage a packet communication amount for each traffic type or each flow;

a bandwidth calculation function to allocate a bandwidth to a traffic type or a flow, which decreases a bandwidth allocated to the traffic type or the flow with a relatively large average communication amount per previously determined unit time, and increases the bandwidth allocated to the traffic type or the flow with a relatively small average communication amount; and a transmission control function which selects the traffic type or the flow to transmit a packet according to packet presence or absence for each traffic type or each flow stored by the buffer control function and allocated bandwidth, reads the packet of the traffic type or the flow from the buffer control function and transmits read packet.

According to another solving means of this invention, there is provided a communication control processor comprising:

a buffer control function to store a received packet for each traffic type or each flow;

a discard control function which manages a packet communication amount for each traffic type or each flow, refers to the packet communication amount per a previously determined time, and obtains a session connection time;

a bandwidth calculation function to allocate a bandwidth to a traffic type or a flow, which decreases the bandwidth allocated to the traffic type or the flow with a relatively large session connection time, and increases the bandwidth allocated to the traffic type or the flow with a relatively small session connection time; and a transmission control function which selects the traffic type or the flow to transmit a packet according to packet presence or absence for each traffic type or each flow stored by the buffer control function and allocated bandwidth, reads the packet of the traffic type or the flow from the buffer control function and transmits read packet.

According to the invention, it is possible to provide a bandwidth control apparatus and a communication control semiconductor, in which a tendency that a heavy user with a large communication amount is liable to occupy a bandwidth is corrected, and when a line has room, the bandwidth can be used up to a maximum bandwidth of each user.

Besides, according to the invention, it is possible to perform fine bandwidth control based on a communication state, for example, a usable bandwidth for a heavy user is made small, and a usable bandwidth for a light user is made large. Thereby, it is possible to provide an optimum bandwidth control method for an ISP to provide an always-connected service, in which a difference in communication amount between a heavy user and a light user is corrected.

Further, according to one embodiment of the invention, it is possible to provide a bandwidth control apparatus having a bandwidth control function to calculate a usable bandwidth from a communication amount of each user and a minimum bandwidth/maximum bandwidth. Besides, according to another embodiment of the invention, it is possible to provide a bandwidth control apparatus having a bandwidth control function to calculate a usable bandwidth from a session connection time of each user.

BRIEF DESCRIPTION OF THE DRAWINGS

FIG. 5 is a view showing a calculation example of the usable bandwidth in the bandwidth control apparatus of the first embodiment.

FIG. 7 is a view showing a calculation example of the usable bandwidth in the bandwidth control apparatus of the second embodiment.

FIG. 12 is an explanatory view of a transmission scheduled time memory 111.

FIG. 13 is an explanatory view of group information.

DETAILED DESCRIPTION OF THE INVENTION

1. First Embodiment (Structure of the Apparatus)

Figure 2:
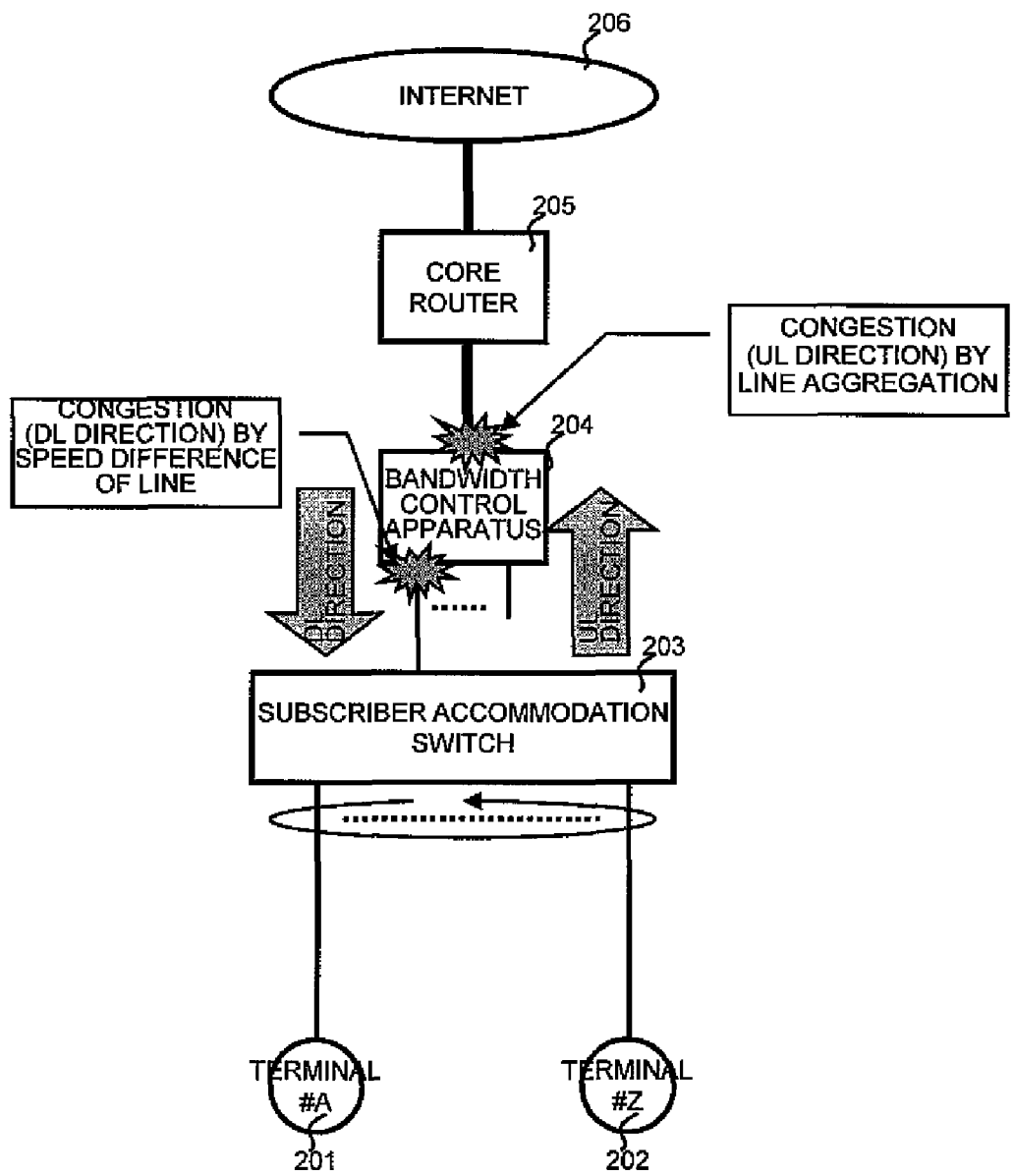
FIG. 2 is a structural view of a user accommodation network.

FIG. 2 is a structural view of a user accommodation network.

FIG. 2 shows a conceptual image of the user reception network such as Fiber To The Home (FTTH) or Asymmetric Digital Subscriber Line (ADSL), and shows the physical structure of the network which is an application area of a bandwidth control apparatus.

In the user reception network of FIG. 2, a bandwidth control apparatus 204 is disposed between, for example, a core router 205 and a subscriber accommodation switch 203. Incidentally, a bandwidth control function may be incorporated in the core router 205 or the subscriber accommodation switch 203.

The bandwidth control apparatus 204 is placed between, for example, the core router 205 at the higher line side and the subscriber accommodation switch 203 at the lower line side, and the network structure is such that communication between a terminal 201, 202 and the Internet 206 is performed via the bandwidth control apparatus 204. Incidentally, the bandwidth control apparatus 204 is a packet relay apparatus in which an inputted traffic is once stored in a buffer memory, and the bandwidth control is performed based on the minimum bandwidth and maximum bandwidth set for each user.

Figure 1:
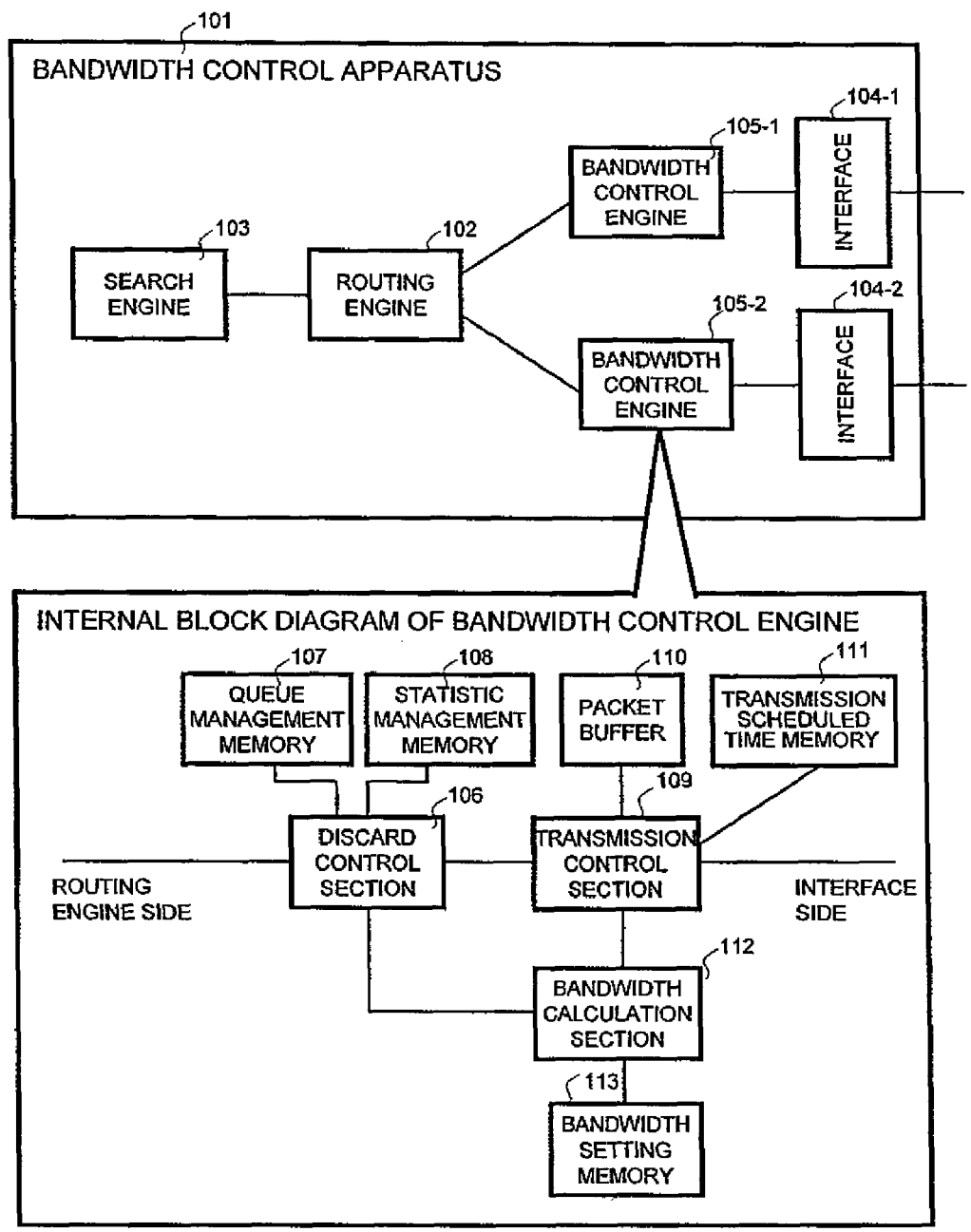
FIG. 1 is a block diagram of a bandwidth control apparatus.

FIG. 1 is a block diagram of a bandwidth control apparatus.

A bandwidth control apparatus 101 includes, for example, a routing engine 102, a search engine 103, an interface 104 and a bandwidth control engine 105. In FIG. 1, although the plural bandwidth control engines 105 are independently installed for the respective lines, a concentration engine type arrangement may be adopted in which one bandwidth control engine is disposed for the bandwidth control apparatus 101, or one semiconductor may be disposed which integrally includes the routing engine 102, the search engine 103, the interface 104 and the bandwidth control engine 105, and no limitation is made to these. Besides, the process of the search engine 103, and an after-mentioned discard control section, a bandwidth calculation section, and a transmission section may be realized by using software. Incidentally, the number of the interfaces 104 and that of the bandwidth control engines 105 are not limited to the illustrated example, but may be an appropriate number.

The routing engine 102 has a function that, for example, determines a received packet type, extracts information necessary for destination search of the packet, and transfers it to the search engine 103. The information provided to the search engine 103 is, for example, the determination result of the packet type (for example, Etherv2, IEEE802.3, IPv4, IPv6, etc.), and the header information in the packet (for example, layer 2 to layer 4). The routing engine 102 stores the packet information until the search engine 103 completes the search, and transfers the packet information to the bandwidth control engine 105 corresponding to the destination obtained by the response of the search engine 103. Incidentally, the user ID information obtained by the search engine 103 is also transferred to the bandwidth control engine 105 by the routing engine 102.

Based on the information obtained from the routing engine 102, the search engine 103 performs a route search process and a flow search process for determining the user ID information used in the control of the bandwidth control engine 105. In the route search process, the search engine 103 uses, for example, a destination MAC address for layer 2 transfer or an destination IP address for layer 3 transfer, and searches for the destination by a comparison and coincidence process to a transfer table (called a forwarding table or a routing table) in the search engine 103. The search engine 103 transfers the information of the coincident destination line to the routing engine 102. In the flow search process, the search engine 103 previously sets information as search keys of the layer 2 to the layer 4 for each user ID information, and similarly to the route search process, the user ID information of the packet information is obtained by the comparison and coincidence process to the flow search table, and the user ID information is transferred to the routing engine 102. Incidentally, in order to complete these comparison and coincidence processes in a short time, a memory element dedicated for the comparison and coincidence process, called Content Addressable Memory (CAM), may be used for the transfer table and the flow search table.

Based on the user ID information given by the search engine 103, the bandwidth control engine 105 performs the bandwidth control by the minimum bandwidth and the maximum bandwidth previously set for each user. The interface 104 is an interface for communicating with an external equipment such as the core router 205.

Incidentally, in this embodiment, the bandwidth control apparatus having two-step layers is disclosed as an example. Specifically, for example, in the first layer, the bandwidth control based on the maximum bandwidth is performed in the group in which users are bundled, and in the second layer, the bandwidth control based on the minimum bandwidth and the maximum bandwidth is performed for each user. Incidentally, the feature of the bandwidth control apparatus of the embodiment is not limited to the number of layers in the bandwidth control. That is, the bandwidth control function for one layer or three or more layers may be provided, and no limitation is made to these.

Hereinafter, the bandwidth control engine 105 will be described in detail.

The bandwidth control engine 105 includes, for example, a discard control section 106, a queue management memory 107, a statistic management memory 108, a transmission control section 109, a packet buffer 110, a transmission scheduled time memory 111, a bandwidth calculation section 112 and a bandwidth setting memory 113. Incidentally, when the bandwidth control engine 105 is constructed of a semiconductor chip, the packet buffer 110 may be provided in the inside or the outside of the semiconductor, or may have a buffer control function to store a packet in the packet buffer and to read it.

Figure 10:
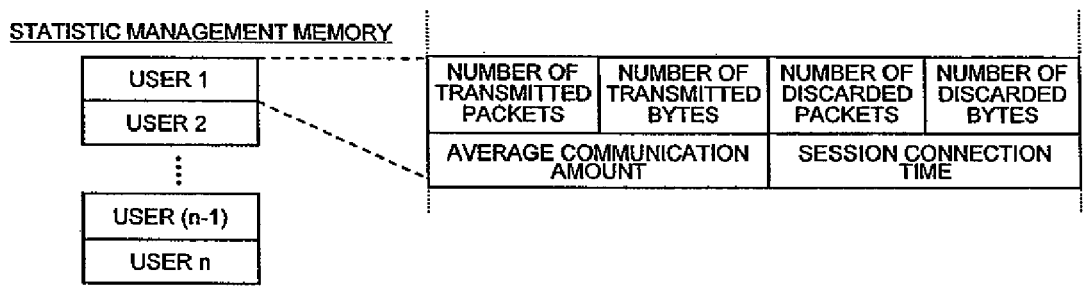
FIG. 10 is a view showing information stored in a statistic management memory 108.

FIG. 10 shows information stored in the statistic management memory 108.

The statistic management memory 108 stores, for example, for each user, the number of transmitted packets, the number of transmitted bytes, an average communication amount, the number of discarded packets, the number of discarded bytes and a session connection time. These information may be stored correspondingly to, for example, user ID information, or may be stored in an address area specified based on the user ID information. The number of transmitted packets and the number of transmitted bytes represent the accumulated amount of transmitted packet information, and represents, for example, the accumulated amount from the start of the bandwidth control apparatus 101 or the accumulated amount after reset at an appropriate timing. The average communication amount represents the accumulated amount of transmitted packet information per unit time. The number of discarded packets and the number of discarded bytes represent the accumulated amount of discarded packet information, and represents, for example, the accumulated amount from the start of the bandwidth control apparatus 101 or the accumulated amount after reset at an appropriate timing. The session connection time represents an elapsed time when each user continuously performs communication. Incidentally, in the statistic management memory 108 of the first embodiment, the session connection time may be omitted.

Figure 11:
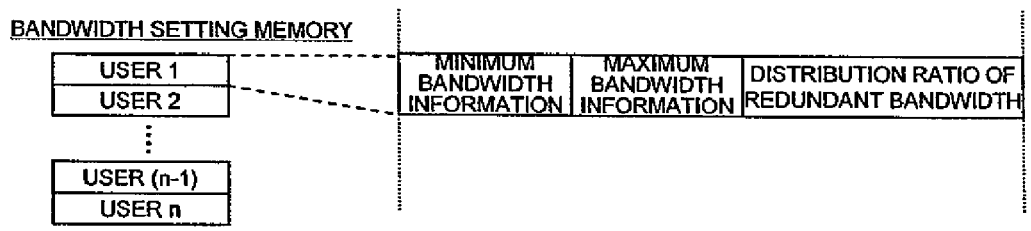
FIG. 11 is a view showing information stored in a bandwidth setting memory 113.

FIG. 11 shows information stored in the bandwidth setting memory 113.

The bandwidth setting memory 113 stores, for example, for each user, minimum bandwidth information, maximum bandwidth information and a distribution ratio of redundant bandwidth. These information may be stored, for example, correspondingly to the user ID information, or may be stored in an address area specified based on the user ID information. The minimum bandwidth information represents a value of the minimum bandwidth previously allocated to a user. The maximum bandwidth information represents a value of the previously determined maximum bandwidth usable by a user. The distribution ratio of the redundant bandwidth represents the ratio at which the redundant bandwidth of a group to which a user belongs is allocated to the user.

FIG. 12 is an explanatory view of the transmission scheduled time memory 111.

The transmission scheduled time memory 111 includes, for example, for each group in which users are bundled, a transmission scheduled time according to the maximum bandwidth of the group, information of packet presence or absence of the group, user ID information of one or plural users belonging to the group, transmission scheduled time according to the usable bandwidth of each user, transmission scheduled time according to the maximum bandwidth of each user, and information of packet presence or absence for each user. Incidentally, the structure of the transmission scheduled time memory 111 is not limited to the illustrated example, and may be made an appropriate structure.

With respect to the transmission scheduled time, a search for a transmission user to transmit packet information and transmission determination are performed based on the transmission scheduled time obtained according to the allocated bandwidth.

FIG. 13 is an explanatory view of group information.

The group information includes, for example, for each group, maximum bandwidth information of a group and user ID information of a user belonging to the group, and is stored in an appropriate memory. The maximum bandwidth information of the group indicates a value of the previously determined maximum bandwidth usable by the group. Incidentally, one or plural pieces of user ID information are stored for one group. Besides, the group information is not limited to the illustrated example, and may be stored in an appropriate structure.

(Operation of Bandwidth Control)

Figure 3:
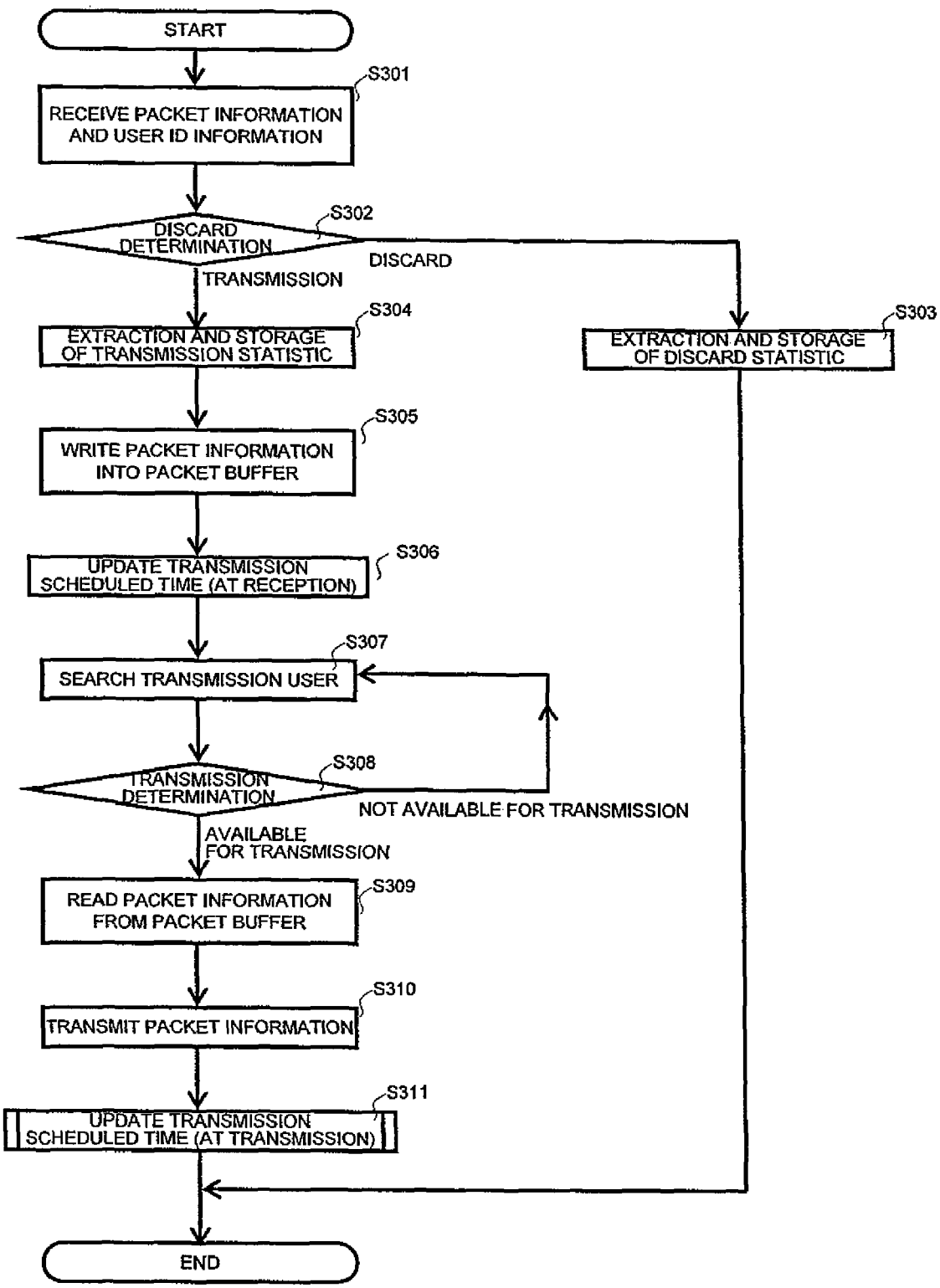
FIG. 3 is a flowchart showing a bandwidth control operation of the bandwidth control apparatus.

FIG. 3 is a flowchart showing the bandwidth control operation of the bandwidth control apparatus.

The operation of the respective sections of the bandwidth control engine 105 will be described with reference to FIG. 3.

The discard control section 106 receives the packet information and the user ID information from the transmission engine 102 (step 301). Next, the discard control section 106 performs discard determination as to whether or not the packet information can be written in the packet buffer 110 (step 302). The bandwidth control apparatus 101 once records the packet information in the packet buffer 110 and performs the transmission scheduling. Thus, it is necessary to determine whether a writable data area remains in the packet buffer 110. In order to prevent a specific user from occupying an area of the packet buffer 110, the bandwidth control apparatus 101 manages the maximum queue length and the number of retained packets for each user by the queue management memory 107. Besides, also when the queue management is performed in the group in which plural users are bundled, it is necessary to manage the queue length and the number of retained packets by a similar procedure and to perform the discard determination and the extraction of statistic information described later.

At step 302, when the determination is "discard (there is no free data area in the packet buffer 110, and the packet information can not be written)", the discard control section 106 stores the number of packets and the number of bytes of the received packet information into the discard statistic information (for example, the number of discarded packets, the number of discarded bytes) of the statistic management memory 108 for each user (step 303). Besides, the discard control section 106 discards the received packet information and completes the process. Incidentally, the discard statistic process at step 303 may be omitted.

On the other hand, at step 302, when the determination is "transmission (packet information can be written in the packet buffer 110)", the discard control section 106 stores the number of packets and the number of bytes of the received packet information in the transmission statistic information (for example, the number of transmitted packets, the number of transmitted bytes) of the statistic management memory 108 for each user (step 304). After the completion of the process, the discard control section 106 transfers the packet information and the user ID information to the transmission control section 109. Incidentally, in the first embodiment, reference is made to the information of the number of transmitted bytes extracted by the process, and a process (calculation process of usable bandwidth) of determining the communication bandwidth of each user is performed later.

The transmission control section 109 which receives the packet information and the user ID information issues a packet information writing instruction to the packet buffer 110 to store the packet information until a transmission user is determined (step 305). Incidentally, the transmission control section 109 separately manages the information of an address at which the packet information is written in order to grasp the area where the data was written when the packet information is read from the packet buffer 110.

The transmission control section 109 performs an update (at the time of reception) process of the transmission scheduled time of the packet reception user (step 306). For example, at the time of packet reception, based on the user ID information, the transmission control section 109 refers to the transmission scheduled time according to the usable bandwidth of the user to which the packet information belongs, the transmission scheduled time according to the maximum bandwidth of the user, packet presence or absence information of the user, and the transmission scheduled time according to the maximum bandwidth of the group to which the packet information belongs, which are stored in the transmission scheduled time memory 111. When the transmission scheduled time according to the usable bandwidth of the user, the transmission scheduled time according to the maximum bandwidth of the user, and the transmission scheduled time according to the maximum bandwidth of the group, to which the reference is made, respectively shows the past with respect to the present time, and the information of the packet presence or absence of the user is "absence" (there is no packet information), the transmission control section 109 updates the transmission scheduled time according to the usable bandwidth of the user, the transmission scheduled time according to the maximum bandwidth of the user, and the transmission scheduled time according to the maximum bandwidth of the group to the present time. For example, when a packet from a certain user is not received for a specified time or more, the transmission scheduled time becomes the past with respect to the present time, and the transmission scheduled time is updated to the present time by the process at step 306. The transmission control section 109 does not update the respective transmission scheduled times under a condition other than that. Besides, when the information of the packet presence or absence of the group to which the packet information belongs and the information of the packet presence or absence of the user are originally "absence", the transmission control section 109 changes it to "presence" (there is packet information).

The transmission control section 109 performs a scheduling process (search for a transmission user) to determine a transmission user from plural users (step 307). In order to determine the transmission user, the transmission control section 109 uses the transmission scheduled time according to the usable bandwidth of each user and the information of the packet presence or absence for each user, which are stored in the transmission scheduled time memory 111. The transmission control section 109 refers to the transmission scheduled time memory 111, and selects, as the transmission user, the user indicating the oldest transmission scheduled time according to the usable bandwidth of the user from users for which the information of the packet presence or absence of the user is "presence", and acquires the corresponding user ID information. The usable bandwidth is provided from the bandwidth calculation section 112, and the calculation method thereof will be clarified later. The transmission scheduling according to the usable bandwidth is performed by the above procedure, and the transmission user is selected.

The transmission control section 109 performs a transmission determination process as to whether or not the packet information of the transmission user selected at step 307 can be transmitted (step 308). In the transmission determination process, the transmission control section 109 refers to the transmission scheduled time according to the maximum bandwidth of the user (transmission user) recorded in the transmission scheduled time memory 111 and the transmission scheduled time according to the maximum bandwidth of the group to which the user belongs. When either one of the transmission scheduled times does not reach the present time, the transmission control section 109 determines that the transmission is impossible, and when the present time is past both the transmission scheduled times, the transmission control section determines that the transmission is possible. When either one of the transmission scheduled times does not reach the present time, and when the packet information is transmitted at the present time, it exceeds the maximum bandwidth. On the other hand, when the present time is past both the transmission scheduled times, even if the packet information is transmitted, it does not exceed the maximum bandwidth. Besides, when the transmission determination is performed using the transmission scheduled time according to the maximum bandwidth of the user, for example, even if a heavy user exceeds the usable bandwidth, the heavy user can use the bandwidth within the range not exceeding the maximum bandwidth of the user, and the bandwidth can be effectively used when the line is free.

Incidentally, another unit for transmission determination is conceivable. For example, the transmission scheduled time according to the maximum bandwidth of each user is not used, but the transmission scheduled time according to the usable bandwidth of each user, which is calculated by the usable bandwidth, can also be used. In that case, since the output bandwidth is suppressed by the usable bandwidth, it is the effective unit when the bandwidth suppression of the user is desired to be performed even if the line is free. Besides, when the transmission determination is performed for each user by one of the maximum bandwidth and the usable bandwidth, a more flexible bandwidth control function can be provided.

When it is determined at step 308 that the transmission is impossible, the transmission control section 109 returns to the scheduling process to determine the transmission user at step 307, and continues the process. The reason why the search for the transmission user is again performed is that the transmission scheduled time of the received user is updated by the packet reception before the already selected transmission user is placed in a usable state, and there is a possibility that another user appropriate to the transmission user appears. Thus, the transmission control section 109 periodically confirms (searches) the transmission user.

On the other hand, when it is determined at step 308 that the transmission is possible, the transmission control section 109 reads the packet information of the transmission user from the packet buffer 110 (step 309). The information of the position where the packet information is written is grasped for each user at the time point of the process of step 305, and the transmission control section 109 reads the packet information of the transmission user based on the information.

The transmission control section 109 transfers the read packet information to the interface 104, and transmits the packet information to an external connection equipment (step 310).

The transmission control section 109 performs an update (at the time of transmission) process of the transmission scheduled time (step 311).

For example, after the transmission of the packet information, the transmission control section 109 updates the transmission scheduled time according to the usable bandwidth of the transmission user, the transmission scheduled time according to the maximum bandwidth of the transmission user, the information of the packet presence or absence of the transmission user, the transmission scheduled time according to the maximum bandwidth of the group to which the transmission user belongs, and the information of the packet presence or absence of the group as described below.

First, the update of the information of the packet presence or absence will be described.

With respect to the information of the packet presence or absence of the transmission user, when the number of retained packets of the transmission user is 1, since the packet information retained in the packet buffer 110 disappears by the transmission of the packet information, the transmission control section 109 updates the information of the packet presence or absence of the user corresponding to the user ID information of the transmission user in the transmission scheduled time memory 111 to "absence", and does not perform the update under a condition other than that. Besides, with respect to the information of the packet presence or absence of the group, as an example, when the information of the packet presence or absence of every user belonging to the group is "absence", the transmission control section 109 may update the information of the packet presence or absence of the group to "absence", or may manage the number of retained packets for each group.

Next, the update of the transmission scheduled time will be described.

The information necessary for the update of the transmission scheduled time is the bandwidth information at each transmission scheduled time and the information of the transmission packet length. The bandwidth information is transmitted from the bandwidth calculation section 112 to the transmission control section 109. The update process of the transmission scheduled time at the time of packet information transmission is performed by summing the transmission scheduled time before the packet transmission and a result obtained by dividing the transmission packet length by each bandwidth information. The transmission scheduled time is expressed by, for example, the following expression.

(transmission scheduled time)=(transmission scheduled time before packet transmission)+(transmission packet length)/(various bandwidth)

"the various bandwidth" in the above expression is the bandwidth information transmitted from the bandwidth calculation section 112, and corresponds to the usable bandwidth and the maximum bandwidth of each user, and the maximum bandwidth of each group. Incidentally, the value of the maximum bandwidth of each user and that of each group are previously set values. On the other hand, the usable bandwidth is calculated by the bandwidth calculation section 112. The calculation process of the usable bandwidth will be described later. Incidentally, when the transmission scheduled time is calculated, it is appropriate that whether or not the preamble as the overhead portion on the Ethernet packet, Start Frame Delimeter (SFD) and Inter Frame Gap (IFG) are included in the bandwidth calculation can be selected according to the specification.

With respect to the update of each transmission scheduled time, the specific operation of the respective blocks will be described below.

The transmission control section 109 notifies the bandwidth calculation section 112 about the user ID information of the transmission user. The bandwidth calculation section 112 acquires the maximum bandwidth information of the corresponding user and the minimum bandwidth information of the user from the bandwidth setting memory 113 based on the user ID information. Besides, the bandwidth calculation section 112 acquires the maximum bandwidth information of the corresponding group from the group information based on the user ID information. Further, the bandwidth calculation section 112 calculates the usable bandwidth of the user based on the acquired bandwidth information (calculation process of the usable bandwidth). The bandwidth calculation section 112 notifies the transmission control section 109 about the acquired maximum bandwidth information of the user, the maximum bandwidth information of the group and the calculated usable bandwidth.

The transmission control section 109 calculates the transmission scheduled time according to the calculated usable bandwidth of the user by the foregoing expression based on the notified usable bandwidth, the transmission scheduled time according to the usable bandwidth of the user before the packet transmission stored in the transmission scheduled time memory 111, and the packet length of the packet information transmitted at step 310. The transmission control section 109 stores the transmission scheduled time according to the calculated usable bandwidth of the user into the transmission scheduled time memory 111 correspondingly to the user ID information. Besides, the transmission control section 109 calculates the transmission scheduled time according to the maximum bandwidth of the user by the foregoing expression based on the notified maximum bandwidth information of the user, the transmission scheduled time according to the maximum bandwidth of the user before the packet transmission stored in the transmission scheduled time memory 111, and the packet length of the packet information transmitted at step 310. The transmission control section 109 stores the calculated transmission scheduled time according to the maximum bandwidth of the user into the transmission scheduled time memory 111 correspondingly to the user ID information. Further, the transmission control section 109 calculates the transmission scheduled time according to the maximum bandwidth of the group by the foregoing expression based on the notified maximum bandwidth information of the group, the transmission scheduled time according to the maximum bandwidth of the group before the packet transmission stored in the transmission scheduled time memory 111, and the packet length of the packet information transmitted at step 310. The transmission control section 109 stores the calculated transmission scheduled time according to the maximum bandwidth of the group into the transmission scheduled time memory 111 correspondingly to the user ID information.

Besides, since the transmission scheduled time according to the usable bandwidth of the user is used for determining the transmission order of users, there is a case where the transmission of the packet information is performed even if the transmission scheduled time according to the usable bandwidth of the user does not reach the present (present time). When the transmission scheduled time according to the usable bandwidth before the packet transmission does not reach "the present", the transmission control section 109 replaces the transmission scheduled time before the packet transmission in the calculation expression by the present time, performs the calculation, and completes the process shown in the flowchart.

By performing the series of processes shown in FIG. 3, the bandwidth control apparatus 101 performs the discard determination of the inputted traffic (packet information), stores the packet information, which is not determined to be discarded, into the buffer memory (for example, the packet buffer 110), calculates the usable bandwidth from the minimum bandwidth and the maximum bandwidth set for each user, and can realize the bandwidth control function to perform the transmission scheduling based on the usable bandwidth.

(Calculation of the Usable Bandwidth)

Next, the calculation process of the usable bandwidth by the bandwidth calculation section 112 will be described. The first embodiment provides the bandwidth control function according to the usable bandwidth calculated based on the communication amount of each user.

Figure 4:
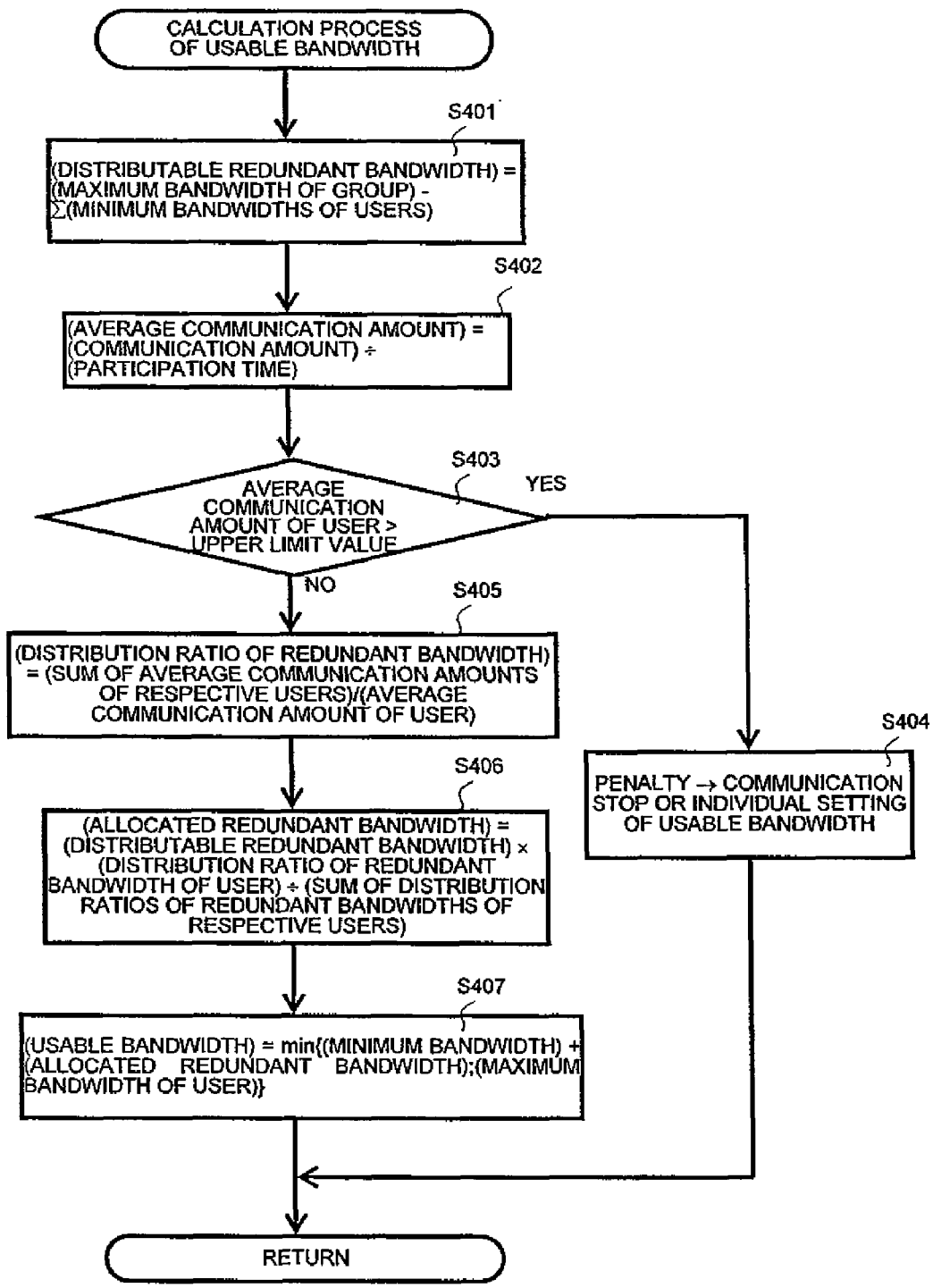
FIG. 4 is a flowchart used for calculation of a usable bandwidth in a bandwidth control apparatus of a first embodiment.

FIG. 4 shows a flowchart of the calculation process of the usable bandwidth in the first embodiment.

The bandwidth calculation section 112 calculates the amount of redundant bandwidth which can be distributed for calculation of the usable bandwidth (step 401). The values of the minimum bandwidth and the maximum bandwidth previously set for each user are stored in the bandwidth setting memory 113. Besides, the value of the maximum bandwidth of the group is previously stored in an appropriate memory. The bandwidth calculation section 112 calculates the redundant bandwidth, which can be distributed to all users, from those values. The distributable redundant bandwidth is, for example, the value obtained by subtracting the sum of the minimum bandwidths of the respective users from the maximum bandwidth of the group to which the plural users belong.

An example of the operation will be described. For example, the bandwidth calculation section 112 refers to the group information based on the user ID information of the transmission user notified from the transmission control section 109, and acquires the maximum bandwidth information of the corresponding group and the user ID information of the user belonging to the same group. The bandwidth calculation section 112 acquires the minimum bandwidth information corresponding to the acquired user ID information from the bandwidth setting memory 113. The bandwidth calculation section 112 subtracts the sum of the respective minimum bandwidth information from the acquired maximum bandwidth information of the group, and obtains the distributable redundant bandwidth.

Incidentally, in the calculation expression to obtain the redundant bandwidth, the minimum bandwidth of the user who does not perform communication is removed from the sum of the minimum bandwidths of the users. By this, the minimum bandwidth of the user who does not perform communication can be distributed as the redundant bandwidth to another user, and the bandwidth can be effectively used.

Next, in order to grasp the communication amount of each user, the bandwidth calculation section 112 refers to the information of the number of transmitted bytes stored in the statistic management memory 108, and calculates the average communication amount (step 402). Incidentally, since the number of transmitted bytes is, for example, the accumulated communication amount from the start of the bandwidth control apparatus 101, it can not be determined that the user with a large number of transmitted bytes is the heavy user. Unless the communication amount per time is considered, the user with a longer membership period is penalized. Then, the average communication amount is defined as the communication amount per time. The bandwidth calculation section 112 unifies the time units for measurement of the communication amounts of the respective users, and stores the communication amount in the previously determined same unit as the average communication amount into the statistic management memory 108.

In this embodiment, in the calculation example of obtaining the average communication amount of the respective users, the example is disclosed in which the average communication amount is calculated by using the communication amount for past one hour. However, the average communication amount may be calculated using data in a wider range in time (for example, unit of week or month).

Besides, for example, the time when each user participated in is previously stored in an appropriate memory, and the bandwidth calculation section 112 divides the number of transmitted bytes of the transmission user by the participation time (present time−time at the time of participation) and may calculate the average communication amount.

Next, the bandwidth calculation section 112 performs a determination process to compare the average communication amount of the transmission user with the upper limit value of the average communication amount and to impose a severer penalty on a transmission user who exceeds the upper limit value of the average communication amount (step 403). The upper limit value of the average communication amount is a numerical value previously given by setting. When the average communication amount of the transmission user exceeds the upper limit value of the average communication amount (yes at step 403), the bandwidth calculation section 112 performs a process to impose the penalty such as, for example, communication interruption to the transmission user or application of more severe bandwidth control to the transmission user as the heavy user (step 404). Incidentally, according to whether the user pays a high use fee or according to a flow type, the upper limit value of the average communication amount may be set to a different value, or the user may be removed from the object of the determination. When it is not necessary to provide the upper limit value of the average communication amount, the processes of step 403 and step 404 can be omitted.

On the other hand, when the average communication amount of the transmission user does not exceed the upper limit value of the average communication amount (no at step 403), the bandwidth calculation section 112 calculates the distribution ratio of the redundant bandwidth (step 405). With respect to the distribution ratio of the redundant bandwidth, "the average communication amount of each user" calculated at step 402 is used, and the control is performed such that the distribution ratio of the redundant bandwidth is made small for the user with a relatively large communication amount and the distribution ratio of the redundant bandwidth is made large for the user with a relatively small communication amount. Incidentally, in this embodiment, for simplicity of the description, for example, the distribution ratio of the redundant bandwidth is calculated from the inverse number of "the average communication amount of each user". However, the calculation of the distribution ratio of the redundant bandwidth may be changed to a function along the operation policy of each ISP. For example, a previously determined function may be used in which as the average communication amount increases, the bandwidth decreases. Besides, at the same time as the process to obtain the distribution ratio of the redundant bandwidth of each user, the bandwidth calculation section 112 calculates the total value of the distribution ratios of the redundant bandwidth of the respective users. Incidentally, when the total value of the distribution ratios of the redundant bandwidth of the respective users is calculated, the distribution ratio of the redundant bandwidth of the user who does not perform communication is removed. The bandwidth calculation section 112 stores the calculated distribution ratio of the redundant bandwidth of each user into the bandwidth setting memory 113 correspondingly to the user ID information.

Next, the bandwidth calculation section 112 calculates the redundant bandwidth allocated to each user (step 406). The redundant bandwidth allocated to each user is calculated by, for example, multiplying "the distributable redundant bandwidth" calculated at step 401 by the numerical value obtained by dividing "the distribution ratio of the redundant bandwidth of each user" calculated at step 405 by "the total value of the distribution ratios of the redundant bandwidth of the respective users".

Next, the bandwidth calculation section 112 calculates the usable bandwidth of each user (step 407). The usable bandwidth is calculated by the sum of the redundant bandwidth allocated to the user calculated at step 406 and the minimum bandwidth set for the user or by the maximum bandwidth set for the user. Incidentally, at step 407 of FIG. 4, min {;} means a process of returning the minimum value of values delimited by ";" in "{ }". That is, when the sum of the redundant bandwidth allocated to the user and the minimum bandwidth excesses the maximum bandwidth of the user, the calculation is performed so that the usable bandwidth becomes the maximum bandwidth of the user. More specifically, for example, the bandwidth calculation section 112 acquires the corresponding minimum bandwidth information and the maximum bandwidth information from the bandwidth setting memory 113 based on the user ID information of the transmission user. The bandwidth calculation section 112 compares the sum of the redundant bandwidth allocated to the transmission user calculated at step 406 and the acquired minimum bandwidth information with the acquired maximum bandwidth information, and notifies a smaller value as the usable bandwidth to the transmission control section 109.

FIG. 5 shows a specific bandwidth calculation example of the first embodiment.

In the example shown in FIG. 5, the upper limit value of the average communication amount is not provided, and the process of step 403 and step 404 is omitted. Besides, it is assumed that users of user A to user C are accommodated, and the average communication amount is calculated based on the communication amount in the past one hour, and the usable bandwidth of each user is calculated in accordance with the bandwidth calculation flow (FIG. 4) of the first embodiment. As shown in FIG. 5, a large usable bandwidth is allocated to the user A with a small average communication amount, and a small usable bandwidth is allocated to the user C with a large average communication amount. By this, it is possible to correct the tendency that the heavy user with a large communication amount is liable to occupy the bandwidth. Besides, by performing the transmission determination based on the transmission scheduled time according to the maximum bandwidth of the user, when the line has room even if the communication amount exceeds the usable bandwidth, the line can be used up to the maximum bandwidth of the user. Thus, the line bandwidth can be effectively used to the maximum, and the free network use is not obstructed.

Figure 8:
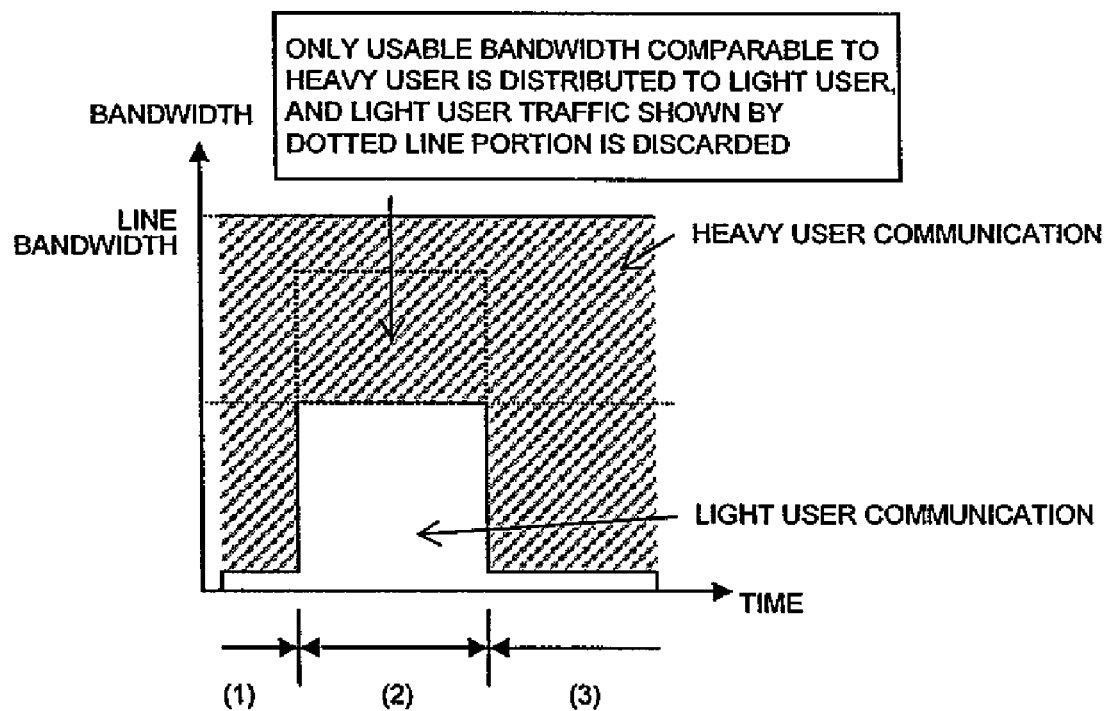
FIG. 8 is a view showing a state of bandwidth allocation to a heavy user and a light user in the related art.

FIG. 8 is a view showing a state of bandwidth allocation to a heavy user and a light user in the related art.

Figure 14:
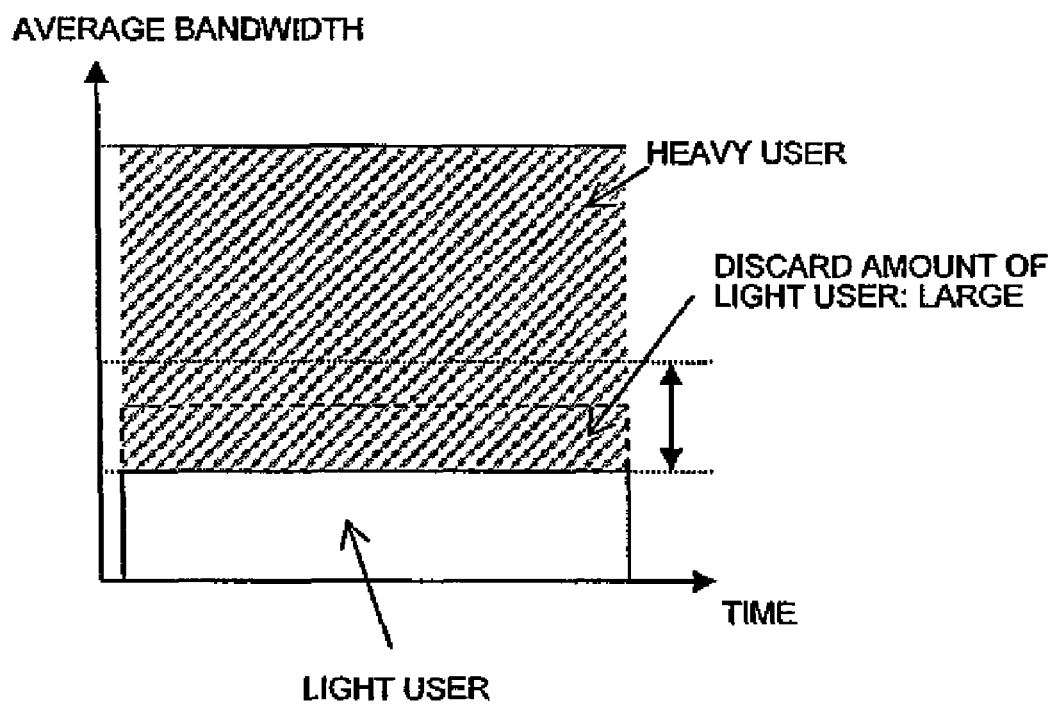
FIG. 14 is an explanatory view showing an average state of bandwidth allocation to a heavy user and a light user in the related art.

In the related art, as shown in FIG. 8, with respect to the calculation of the usable bandwidth for the heavy user and the light user, there is no distinction between the heavy user and the light user, and the calculation of the usable bandwidth is performed fairly. For example, in a period when only the heavy user communicates (for example, periods of (1) and (3) of FIG. 8), the bandwidth is allocated only to the heavy user, and in a period when the line is congested (for example, period of (2) of FIG. 8), since the calculation of the usable bandwidth is performed fairly, the same usable bandwidth is allocated to the heavy user and the light user. Thus, in the congestion period, although there is no bias in communication bandwidth between the users, even for the light user, the number of packets exceeding the allocated bandwidth and discarded in the period becomes large. Thus, when the average in a longer period (for example, the periods of (1) to (3) of FIG. 8) is considered, for example, as shown in FIG. 14, the heavy user obstructs the communication of the light user.

Figure 9:
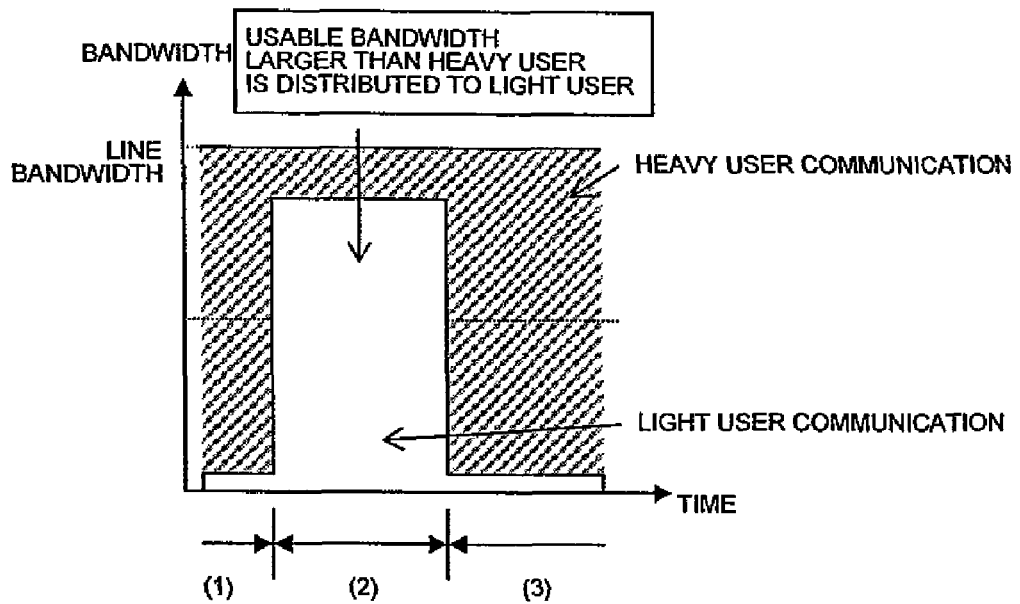
FIG. 9 is a view showing a state of bandwidth allocation to a heavy user and a light user in the first and the second embodiments.

FIG. 9 is a view showing a state of bandwidth allocation to a heavy user and a light user in this embodiment.

Figure 15:
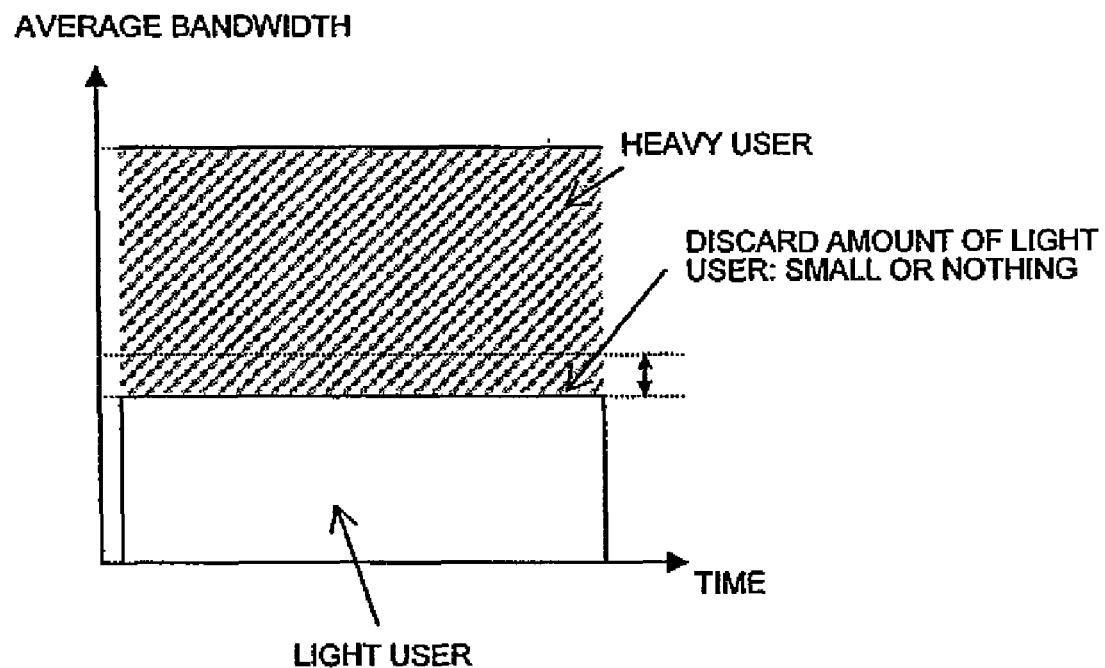
FIG. 15 is an explanatory view showing an average state of bandwidth allocation to a heavy user and a light user in the first and the second embodiments.

By using the bandwidth control function of this embodiment, when the line is congested as shown in FIG. 9, the usable bandwidth of the light user can be made large relative to the heavy user. For example, in a period when only the heavy user communicates (for example, periods of (1) and (3) of FIG. 9), in the scheduling process, the bandwidth is allocated to the user having packet information (heavy user in this case). On the other hand, in a period when the line is congested (for example, period of (2) of FIG. 9), in the scheduling process, a larger bandwidth is allocated to the light user with a small communication amount. Thus, in the congested period, the number of discarded packets of the light user becomes small (or disappears). Thus, when the average in a longer period (for example, the periods of (1) to (3) of FIG. 9) is considered, for example, as shown in FIG. 15, the communication of the light user is ensured.

As stated above, the fairness between the heavy user and the light user in a relatively long period is kept, and when there is no packet information of the light user and there is margin in bandwidth, the heavy user can use the bandwidth, and the effective use of the bandwidth can be realized. Incidentally, at step 308 shown in FIG. 3, when the transmission scheduled time according to the maximum bandwidth of each user is not used for the transmission determination process, and the transmission scheduled time according to the usable bandwidth of each user is used for the transmission determination process, the bandwidth control can be performed such that even if the line has room, the transmission exceeding the usable bandwidth is not permitted.

2. Second Embodiment

In a second embodiment, there is provided a bandwidth control function by a usable bandwidth calculated based on a session connection time of each user. Incidentally, a structure of a bandwidth control apparatus 101, a structure of each memory, and an operation of bandwidth control are the same as those of the first embodiment. The calculation process (FIG. 4) of the usable bandwidth in the first embodiment is replaced by a process described below.

The session connection time is an elapsed time when each user continuously performs communication. In the P2P communication, communication is performed via adjacent clients, and as a feature of a client (hereinafter referred to as a super node) to exert a bad influence on the network, the client has a high line speed, is adjacent to many clients, holds highly demanded information resources, receives download requests from other clients successively, and has a tendency that the communication is performed continuously for a long time without interruption. Although there is a case where it can not be certainly determined by the session connection time whether the P2P communication is performed, when the communication bandwidth of the super node to exert a bad influence on the network can be suppressed, as a result, the P2P communication amount of the whole network can be effectively suppressed. Besides, also in the server-client type communication, when an access is continuously made to the information resource as in a butch process, since an excessive load is similarly exerted on the network, the client can be specified as an object whose bandwidth is suppressed. Incidentally, in the communication such as WEB browsing, an access is manually made to the information resource, and communication does not occur in a period when a WEB page is browsed, and accordingly, there is a low probability that the communication continuously occurs for a long time. Accordingly, the bandwidth control can be effectively performed only for the communication to exert a load on the network.

Figure 6:
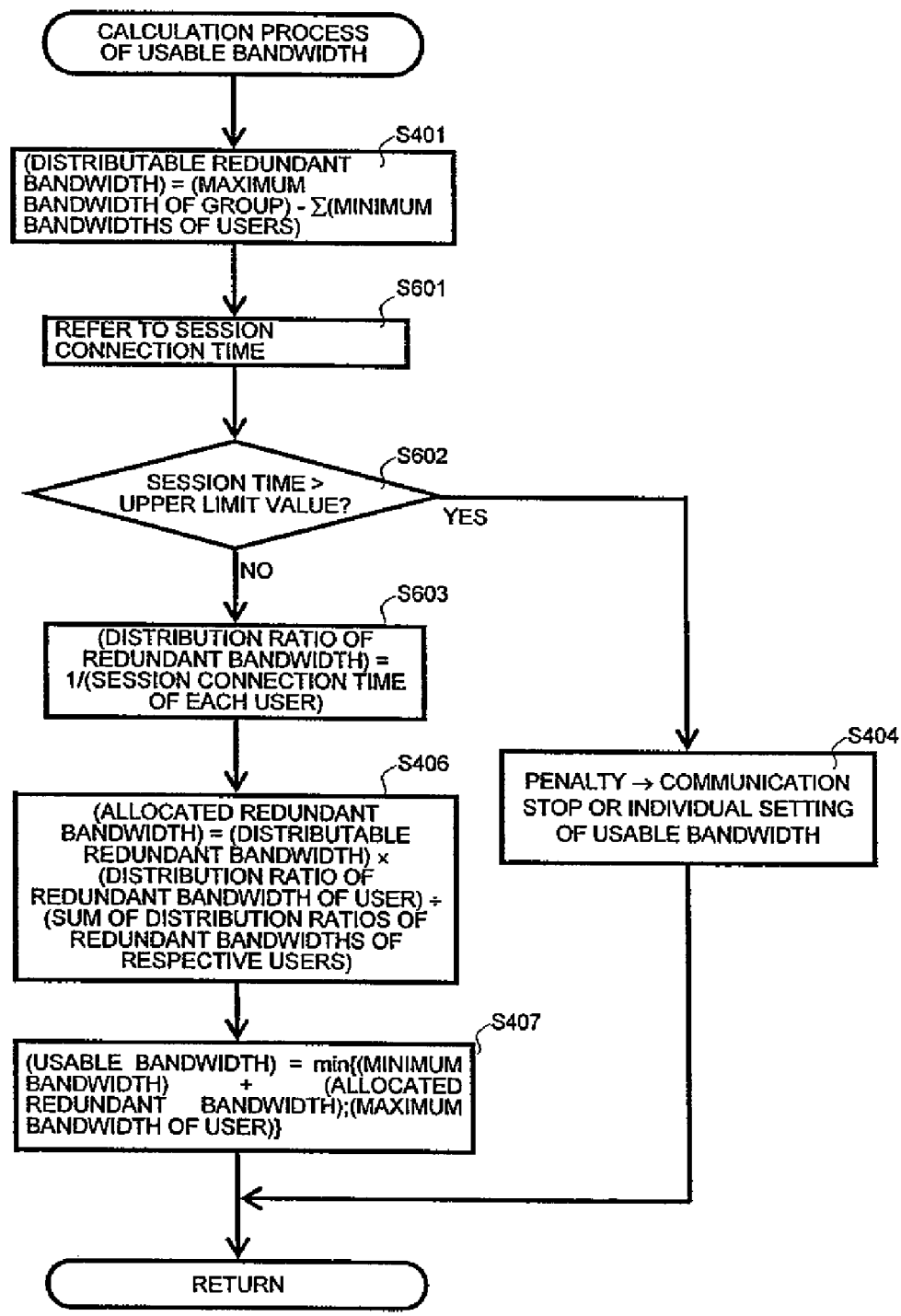
FIG. 6 is a flowchart used for calculation of a usable bandwidth in a bandwidth control apparatus of a second embodiment.

FIG. 6 is a flowchart of the calculation process of the usable bandwidth in the bandwidth control apparatus of the second embodiment.

First, a bandwidth calculation section 112 calculates the amount of distributable redundant bandwidth for calculation of the usable bandwidth (step 401). Since this process content is the same as that of the first embodiment, its description is omitted.

Next, in order to grasp the session connection time of each user, the bandwidth calculation section 112 refers to the information of the session connection time stored in a statistic management memory 108 (step 601). Incidentally, as a calculation method of the session connection time, for example, a discard control section 106 periodically polls the transmission statistic information recorded in the statistic management memory 108 to monitor whether the information such as the number of transmitted packets increases, and when the number of transmitted packets continues to increase, the session connection time of the statistic management memory 108 is increased, and when the number of transmitted packets does not change, the session connection time of the statistic management memory 108 is cleared. More specifically, for example, when a reference is made to the number of transmitted packets (or the number of transmitted bytes) of the statistic management memory 108, the discard control section 106 stores the referred number of transmitted packets into an appropriate memory, and the next time when a reference is made to the number of transmitted packets of the statistic management memory 108, the discard control section compares the referred number of transmitted packets with the stored number of transmitted packets, and can determine whether or not the number of transmitted packets increases. Incidentally, the session connection time is stored in the statistic management memory 108 for each user. Besides, the monitor interval of the session connection time can be freely set by a parameter, and it can be put in a state where tuning can be made in accordance with the use state of the real network.

Next, the bandwidth calculation section 112 performs a determination process to compare the session connection time of the transmission user with the upper limit value of the session connection time and to impose a severer penalty on a transmission user who exceeds the upper limit value of the session connection time (step 602). Incidentally, the upper limit value of the session connection time is, for example, previously set in an appropriate memory. When the session connection time of the transmission user exceeds the upper limit value of the session connection time (yes at step 602), the bandwidth calculation section 112 performs the process to impose the penalty such as, for example, communication interruption to the transmission user or application of more severe bandwidth control to the transmission user as the heavy user (step 404). Incidentally, according to whether the user pays a high use fee or according to a flow type, the upper limit value of the session connection time may be set to a different value, or the user may be removed from the object of the determination. When it is not necessary to provide the upper limit value of the session connection time, the process of step 602 and step 404 can be omitted.

On the other hand, when the session connection time of the transmission user does not exceed the upper limit value of the session connection time (no at step 602), the bandwidth calculation section 112 calculates the distribution ratio of redundant bandwidth (step 603). With respect to the distribution ratio of the redundant bandwidth, "the session connection time of each user" referred to at step 601 is used. In this embodiment, the distribution ratio of the redundant bandwidth is made small for the user with a relatively long session connection time, and the distribution ratio is made large for the user with a relatively short session connection time. Incidentally, in this embodiment, for simplicity of the description, for example, the inverse number of "the session connection time of each user" is disclosed as the distribution ratio of the redundant bandwidth. However, the calculation of the distribution ratio of the redundant bandwidth may be changed to a function along the operation policy of the ISP. For example, a previously determined function may be used in which as the session connection time increases, the bandwidth decrease. Besides, at the same time as the process to obtain the distribution ratio of the redundant bandwidth of each user, the bandwidth calculation section 112 calculates the total value of the distribution ratios of the redundant bandwidths of the respective users. When the total value of the distribution ratios of the redundant bandwidths of the respective users is calculated, the distribution ratio of the redundant bandwidth of the user who does not perform communication is removed. The bandwidth calculation section 112 stores the calculated distribution ratio of the redundant bandwidth of each user into the bandwidth setting memory 113 correspondingly to the user ID information.

Next, the bandwidth calculation section 112 calculates the redundant bandwidth allocated to each user (step 406), and calculates the usable bandwidth of each user (step 407). Since the process content is the same as that of the first embodiment, its description is omitted.

FIG. 7 shows a specific bandwidth calculation example of the second embodiment.

In the example shown in FIG. 7, the upper limit value of the session connection time is not provided, and the process of step 602 and step 404 is omitted. Besides, users of user A to user C are accommodated, and the usable bandwidth of each user is calculated in accordance with the bandwidth calculation flow (FIG. 6) of the second embodiment. As shown in FIG. 7, a large usable bandwidth is allocated to the user A and the user B with a short session connection time, and a small usable bandwidth is allocated to the user C with a long session connection time. By this, it is possible to correct a tendency that the traffic of the user with a long session connection time is liable to occupy the bandwidth. Besides, by performing the transmission determination based on the transmission scheduled time according to the maximum bandwidth of the user, when the line has room even when the traffic exceeds the usable bandwidth, the line can be used up to the maximum bandwidth of each user. Thus, the line bandwidth can be effectively used to the maximum, and the free network use is not obstructed.

The state of bandwidth allocation to the heavy user and the light user according to this embodiment is similar to the first embodiment (for example, see FIGS. 8 and 9, FIGS. 14 and 15). For example, in the related art, as shown in FIG. 8, with respect to the calculation of the usable bandwidth for the heavy user and the light user, there is no distinction between the heavy user and the light user, and the calculation of the usable bandwidth is performed fairly. On the other hand, by using the bandwidth control function of this embodiment, as shown in FIG. 9, when the line is congested, the usable bandwidth of the light user can be made larger than that of the heavy user.

Incidentally, similarly to the first embodiment, at step 308 shown in FIG. 3, when the transmission scheduled time according to the maximum bandwidth of each user is not used for the transmission determination process, but the transmission scheduled time according to the usable bandwidth of each user is used for the transmission determination process, the bandwidth control can be performed such that even if the line has room, transmission exceeding the usable bandwidth is not permitted.

3. Modification of the First and the Second Embodiments

In the first and the second embodiments, although the description is made on the assumption that for example, the user is a person who uses, the term of the user may be replaced by a traffic type or a flow. As the classification of the traffic type, for example, it is conceivable that classification into high quality sound, high vision broadcasting, standard quality broadcasting, WEB browsing, P2P communication and the like is performed, and a suitable bandwidth control function is provided for each of them in accordance with the traffic characteristic or the ISP operation policy. For example, the service provided by the ISP itself (for example, high quality sound, high vision broadcasting, etc.) is removed from the object of the bandwidth control based on the communication amount or the session connection time, reduced control is applied to the WEB browsing, and severe control is applied to the P2P communication. As stated above, it is also possible to provide the bandwidth control according to the traffic type. Incidentally, the traffic type and the flow of the received packet can be identified based on the header information of the packet by, for example, the search engine 103.

Besides, as the use mode of the bandwidth control function of the first and the second embodiments, although the description is made using, for example, the FTTH user accommodation network as shown in FIG. 2, the technique can also be applied to a communication apparatus having a packet relay function, such as an access point of wireless LAN or a load balancer as a packet load distribution apparatus, or a part (communication control semiconductor, etc.) to perform the bandwidth control function of the first and the second embodiments.

Besides, although the description is made mainly on the packet with respect to the function of the bandwidth control of the first and the second embodiments, it can also be used as, for example, the bandwidth control of each session for Asynchronous Transfer Mode (ATM). Since the communication unit of the ATM is a fixed length cell, the application becomes possible by performing the calculation with the fixed length cell against the variable length packet when the transmission scheduled time is calculated. The bandwidth control function of the first and the second embodiments can be applied to not only the packet but also another communication protocol such as the ATM, and no limitation is made to these.

The invention can be applied to the packet relay apparatus having the bandwidth control function, the semiconductor chip and the like.

What is claimed is:

1. A bandwidth control apparatus comprising:
a packet buffer to store a received packet for each of users;
a discard control section to manage a packet communication amount for each user;
a bandwidth calculation section to allocate, to each user, a bandwidth that is sum of predetermined minimum bandwidth and allocated redundant bandwidth, the bandwidth calculation section allocating relatively small redundant bandwidth to a user with a relatively large average communication amount per previously determined unit time, and allocating relatively large redundant bandwidth to the user with the relatively small average communication amount per the previously determined unit time; and
a transmission control section which selects a transmission user from among the users to transmit a packet according to packet presence or absence for each user stored in the packet buffer and allocated bandwidth, reads the packet of selected transmission user from the packet buffer and transmits the read packet.

2. The bandwidth control apparatus according to claim 1, wherein
the transmission control section selects the transmission user according to the allocated bandwidth from among the users whose packets are stored in the packet buffer.

3. The bandwidth control apparatus according to claim 1, wherein
with respect to the selected transmission user, even a communication amount exceeds the allocated bandwidth, when it does not exceed a maximum bandwidth previously allocated to the user, the transmission control section reads the packet from the packet buffer and outputs the read packet.

4. The bandwidth control apparatus according to claim 1, wherein
the transmission control section obtains a transmission scheduled time of packet transmission for each user based on the bandwidth allocated to the user and a packet length of a transmitted packet, and
the transmission control section selects, as the transmission user, a user that obtained scheduled time is earliest from among the users whose packets are stored in the packet buffer.

5. The bandwidth control apparatus according to claim 4, wherein
after transmission of a packet, the transmission control section obtains a new transmission scheduled time by summing the transmission scheduled time before the transmission of the packet and a result obtained by dividing the transmitted packet length by the allocated bandwidth.

6. The bandwidth control apparatus according to claim 1, wherein
the bandwidth calculation section obtains an inverse number of the average communication amount and allocates the bandwidth corresponding to the inverse number to the user, or uses a previously determined function in which as the average communication amount increases, the bandwidth decreases, and allocates the bandwidth corresponding to the average communication amount to the user.

7. The bandwidth control apparatus according to claim 1, further comprising:
an interface to receive and transmit a packet;
a search engine to perform a path search process to obtain a destination based on header information of received packet and a flow search process to obtain user identification information based on the header information of the packet; and
a routing engine to transfer the packet and the user identification information obtained by the search engine to the discard control section corresponding to the destination obtained by the search engine.

8. The bandwidth control apparatus according to claim 1, wherein
the predetermined minimum bandwidth is previously determined for each user and
a maximum bandwidth of a group to which one or a plurality of users belong is previously determined,
the bandwidth calculation section obtains a distributable redundant bandwidth by subtracting the predetermined minimum bandwidth of each user belonging to the group from the maximum bandwidth of the group, the bandwidth calculation section distributes and allocates obtained distributable redundant bandwidth to each user according to the average communication amount of the user, and the sum of allocated redundant bandwidth and the predetermined minimum bandwidth of the user is made the bandwidth allocated to the user.

9. The bandwidth control apparatus according to claim 1, wherein
the transmission control section performs transmission suppression to prevent the packet transmission amount from exceeding the allocated bandwidth to perform a bandwidth control to a heavy user when there is a redundant bandwidth of a line connected to the transmission control section.

10. The bandwidth control apparatus according to claim 1, wherein
the bandwidth calculation section provides an upper limit value to the average communication amount of each user managed by the discard control section, and calculates a usable bandwidth based on a previously determined rule for an excess over a threshold.

11. A bandwidth control apparatus comprising:
a packet buffer to store a received packet for each of users,
a discard control section which manages a packet communication amount for each user, refers to the packet communication amount for each user per previously determined time and obtains a session connection time up to the present time for each user;
a bandwidth calculation section to allocate, to each user, a bandwidth that is sum of predetermined minimum bandwidth and allocated redundant bandwidth, the bandwidth calculation section allocating relatively small redundant bandwidth to a user with a relatively large session connection time, and allocating relatively large redundant bandwidth to the user with a relatively small session connection time; and
a transmission control section which selects a transmission user from among the users to transmit a packet according to packet presence or absence for each user stored in the packet buffer and allocated bandwidth, reads the packet of selected transmission user from the packet buffer and transmits the read packet.

12. The bandwidth control apparatus according to claim 11, wherein
the discard control section refers to the packet communication amount per previously determined time, increases the session connection time and updates the session connection time when the packet communication amount increases, and resets the session connection time when the packet communication amount does not increase.

13. The bandwidth control apparatus according to claim 11, wherein
the bandwidth control section obtains an inverse number of the session connection time and allocates the bandwidth corresponding to the inverse number to the user, or uses a previously determined function in which as the session connection time increases, the bandwidth decreases, and allocates the bandwidth corresponding to the session connection time to the user.

14. The bandwidth control apparatus according to claim 11, wherein
the transmission control section selects the transmission user according to the allocated bandwidth from among the users whose packets are stored in the packet buffer.

15. The bandwidth control apparatus according to claim 11, wherein
with respect to the selected transmission user, even if a communication amount exceeds the allocated bandwidth, when it does not exceed a maximum bandwidth previously allocated to the user, the transmission control section reads the packet from the packet buffer and outputs the read packet.

16. The bandwidth control apparatus according to claim 11, wherein
the transmission control section obtains a transmission scheduled time of packet transmission for each user based on the bandwidth allocated to the user and a packet length of a transmitted packet, and
the transmission control section selects, as the transmission user, a user that obtained scheduled time is earliest from among the users whose packets are stored in the packet buffer.

17. A bandwidth control apparatus comprising:
a packet buffer to store a received packet for each of traffic types or each of flows;
a discard control section to manage a packet communication amount for each traffic type or each flow;
a bandwidth calculation section to allocate, to each traffic type or each flow, a bandwidth that is sum of predetermined minimum bandwidth and allocated redundant bandwidth, the bandwidth calculation section allocating relatively small redundant bandwidth to the traffic type or the flow with a relatively large average communication amount per previously determined unit time, and allocating relatively large redundant bandwidth to the traffic type or the flow with a relatively small average communication amount per the previously determined unit time; and
a transmission control section which selects the traffic type or the flow from among the traffic types or the flows to transmit a packet according to packet presence or absence for each traffic type or each flow stored in the packet buffer and allocated bandwidth, reads the packet selected traffic type or the flow from the packet buffer and transmits the read packet.

18. A bandwidth control apparatus comprising:
a packet buffer to store a received packet for each of traffic types or each of flows;
a discard control section which manages a packet communication amount for each traffic type or each flow, refers to the packet communication amount per a previously determined time, and obtains a session connection time;
a bandwidth calculation section to allocate, to each traffic type or each flow, a bandwidth that is sum of predetermined minimum bandwidth and allocated redundant bandwidth, to the bandwidth calculation section allocating relatively small redundant bandwidth to the traffic type or the flow with a relatively large session connection time, and allocating relatively large redundant bandwidth to the traffic type or the flow with a relatively small session connection time; and
a transmission control section which selects the traffic type or the flow from among the traffic types or the flows to transmit a packet according to packet presence or absence for each traffic type or each flow stored in the packet buffer and allocated bandwidth, reads the packet of selected traffic type or the flow from the packet buffer and transmits read packet.

* * * * *